United States Patent Office 3,318,956
Patented May 9, 1967

3,318,956
PROCESS FOR PRODUCING DIHYDROXY-
DIPHENYL SULFONE
Marvin L. Mausner, Teaneck, N.J., assignor to Witco
Chemical Company, Inc., New York, N.Y., a corporation of Delaware
No Drawing. Filed Feb. 24, 1964, Ser. No. 347,017
3 Claims. (Cl. 260—607)

This application is a continuation-in-part of my application Ser. No. 132,300, filed Aug. 18, 1961, now abandoned.

This invention relates to a process for producing dihydroxydiphenyl sulfone.

Sulfones are characterized by the union of the sulfonyl group, $-SO_2-$, and two carbon atoms, and may be represented by the general formula $R_2SO_2$. Sulfones are generally prepared by the action of sulfuric acid, sulfur trioxide, oleum, or chlorosulfonic acid on an aromatic hydrocarbon. By way of illustration, the formation of sulfones prepared by the action of sulfuric acid on an aromatic hydrocarbon conventionally takes place in two steps in accordance with the following equations wherein R represents an aromatic hydrocarbon radical:

(1) 

(2) 

The reactions illustrated by the foregoing equations are reversible. To upset the equilibrium and drive the reactions to completion, the water formed is removed by distillation under vacuum, by distillation with a solvent, or by distillation at elevated temperatures.

In producing dihydroxydiphenyl sulfone in accordance with the two step process illustrated by Equations 1 and 2 above, conventional procedures employ equimolar quantities of concentrated sulfuric acid and phenol in the sulfonation reaction of Equation 1 followed by addition of another mole of phenol to bring about formation of the sulfone as illustrated in Equation 2.

If vacuum is employed to remove the water formed, specialized equipment, of course, is required. If the water is removed by distillation at elevated temperatures, the end product has poor color due to the presence of impurities resulting from side reactions and the yields obtained are on the low side, generally approximately only 40% of theoretical.

It has heretofore been suggested to produce dihydroxydiphenyl sulfone wherein either dichlorethane or tetrachlorethylene is employed to permit azeotropic distillation of the water formed. Although such processes utilize lower temperatures than are required in vacuum and high temperature distillation procedures and result in higher yields of the desired product, they have economic disadvantages in that they employ a relatively expensive solvent to bring about removal of the water and utilize the undesirable two step operation outlined above.

It is the principal object of this invention to provide a single step process for efficiently and economically producing dihydroxydiphenyl sulfone having impoved color, in substantial yields at relatively low temperatures and at normal or atmospheric pressure and essentially free from tars, resins and other objectionable impurities.

I have discovered that the objects of my invention can be achieved by reacting essentially stoichiometric proportions of phenol and concentrated sulfuric acid or fuming sulfuric acid, for example, 20% oleum, utilizing benzene as an azeotroping solvent. I have found that, by employing essentially stoichiometric quantities of the reactants at the start, the reaction goes to completion in a single step with a substantial reduction in disulfonation of the phenol. This has the important advantage of resulting in higher yields of the sulfone, simplifies the equipment, requires less heat energy, and enables the recovery of an end product of improved color characteristics due to the absence or reduction in amount of disulfonated and other impurities. Benzene has been found to be unreactive with the phenolsulfonic acid formed during the reaction. In this manner, competition between the benzene and the phenol to react with the phenolsulfonic acid is substantially eliminated, thus permitting the dihydroxydiphenyl sulfone to be obtained in higher yields and with improved color due to the absence of, or reduction in the amount of, impurities that would result if a phenolsulfonic acid-solvent reaction occurred. In addition to being unreactive, the benzene forms an azeotrope with the water formed during the reaction. The water can thus be distilled at the approximate temperature resulting from the heat of the reaction. In the practice of the invention, the phenol and sulfuric acid are permitted to react until substantially all of the free sulfuric acid, generally at least 99 to 99.5% thereof, has disappeared before the addition of the benzene to the reaction mixture. This results in simplicity and economy of operation and, further, insures against the production of possible undesired side reaction products being formed.

The unusual effectiveness of benzene, in the process here involved, is suprising and could not have been anticipated. In this connection, it is to be noted that aromatic nuclei are prone to electrophilic attack. In the presence of electrophilic agents, such as sulfuric acid and sulfonic acids, aromatic hydrocarbons would be expected not to be satisfactory for use as azeotroping agents and, in fact, this is true of various aromatic hydrocarbons to which one might go to remove water from a reaction mixture at 130 to 170 degrees C. Thus, for instance, both toluene and xylene give by-products, characterized respectively by di- and tri-substitution in the benzene ring, which appear in the infrared spectra in the aromatic substitution region. Benzene, on the other hand, surprisingly has been found to be essentially unreactive relative to phenol in this reaction. The practice of the present invention, therefore, brings about the production of dihydroxydiphenyl sulfone of excellent quality and at a low price in addition to the advantages referred to above.

The temperature at which my process is carried out may range from about 130 degrees C. to about 170 degrees C., more advantageously from 155 to 165 degrees C., with about 160 degrees C. being especially preferred. The benzene is particularly advantageously added in increments at a rate sufficient to maintain the desired temperature conditions. Too rapid addition of the benzene acts to chill the reaction medium and causes premature precipitation of the product as well as violent boiling of the benzene.

The water formed during the reaction is removed continuously by azeotropic distillation. Therefore, the quantity of benzene employed in the process should be sufficient to supply enough vapor to carry over the water to enable the reaction to go to completion at the temperature range employed. The benzene coming over with the distillate may be recovered by conventional methods for re-use.

The following is an illustrative specific example of the manner of carrying out my invention:

Approximately 4 moles of phenol were heated to 150 degrees C. To this were added approximately 2 moles of concentrated sulfuric acid with agitation. A Dean-Stark trap was used.

The reaction mixture was allowed to digest at a temperature of 160 degrees C., the temperature reached due the heat of the reaction upon addition of the acid, or about 2 hours. The trap was then filled with benzene and 20 ml. more were added directly to the reaction mixture at a rate sufficient to maintain the 160 degrees C. temperature.

After about 6 hours benzene was added in 2 ml. increments to maintain reflux until a total of 33 ml. had been added. The water formed as the reaction progressed was continuously removed by azeotropic distillation and intermittently removed from the trap in 2 ml. quantums.

The total reaction time was 13¼ hours, at which point the percent of phenolsulfonic acid present was 12.9. Recovery of the dihydroxydiphenyl sulfone was effected by adding continuously 300 ml. of hot water to the reaction mixture while distilling off the benzene. When all the benzene had been removed the product was filtered and washed with water to remove any unreacted phenol or phenolsulfonic acid. The benzene was recovered for re-use.

In the foregoing example, the percent of phenolsulfonic acid present was reported as being 12.9 after a specified period. This determination served to indicate the extent of the completion of the sulfone-forming reaction and provides a useful method for monitoring the progress of the reaction. Ideally, this determination should be zero indicating that all of the phenolsulfonic acid has been reacted. Practically, this cannot be achieved at operating temperatures described here because they are below the melting point of the finished product undiluted by phenolsulfonic acid.

Yields of dihydroxydiphenyl sulfone obtained in accordance with the practice of my invention approach upwards of 80% of theoretical. The color of the end product is improved due to the substantial absence of side-reaction impurities. The process requires no specialized equipment and offers means for obtaining the desired sulfone in an economical and efficient manner.

While I have described a specific method for carrying out my process, it will be understood that various changes and modifications may be made without departing from the spirit of this invention.

What is claimed as new and desired to be protected by Letters Patent of the United States is:

1. A process for producing dihydroxydiphenyl sulfone which comprises initially reacting substantially stoichiometric proportions of phenol and sulfuric acid at a temperature in the range of 130 to 170 degrees C. under conditions of agitation, then adding benzene in small increments to the reaction mixture and at a rate to maintain the reaction mixture within the aforesaid temperature range, removing the water formed during the reaction by azeotropic distillation, and recovering the dihydroxydiphenyl sulfone from the reaction mixture.

2. A process for producing dihydroxydiphenyl sulfone which comprises initially reacting substantially stoichiometric proportions of phenol and at least substantially concentrated sulfuric acid at a temperature in the range of 155 to 165 degrees C. under conditions of agitation and at substantially atmospheric pressure, then adding benzene in small increments to the reaction mixture and at a rate to maintain the reaction mixture within the aforesaid temperature range, removing the water formed during the reaction by azeotropic distillation, and recovering the dihydroxydiphenyl sulfone from the reaction mixture.

3. A process for producing dihydroxydiphenyl sulfone comprising forming a reaction mixture of substantially stoichiometric proportions of phenol and strong sulfuric acid, permitting the phenol and the sulfuric acid to react at the ambient temperature and pressure for about 2 hours, then incrementally adding benzene to the reaction mixture to maintain the temperature of the mixture at about 160 degrees C. and to form an azeotrope with the water formed during the recation, removing, by azeotropic distillation at the ambient temperature and pressure, the water formed, and recovering the dihydroxydiphenyl sulfone from the reaction mixture.

References Cited by the Examiner

Hinkel et al.: J. Chem. Soc., 1949, 2854–2856.

CHARLES B. PARKER, *Primary Examiner.*

D. R. PHILLIPS, *Assistant Examiner.*